US008699040B2

(12) United States Patent
Din et al.

(10) Patent No.: US 8,699,040 B2
(45) Date of Patent: Apr. 15, 2014

(54) PAPER-FEEDING DEVICE AND MULTI-FUNCTIONAL PRINTERS HAVING A PAPER SEPARATING ELEMENT WITH PAPER INSERTING AND SEPARATING PORTIONS

(75) Inventors: Shih-Jer Din, New Taipei (TW); Ken-Hua Chang, New Taipei (TW)

(73) Assignees: Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 372 days.

(21) Appl. No.: 13/282,436

(22) Filed: Oct. 26, 2011

(65) Prior Publication Data

US 2012/0154839 A1 Jun. 21, 2012

(30) Foreign Application Priority Data

Dec. 17, 2010 (TW) ................................ 99144525 A

(51) Int. Cl.
*G06K 15/00* (2006.01)
*B65H 31/26* (2006.01)

(52) U.S. Cl.
USPC ......... 358/1.12; 358/1.13; 358/414; 358/498; 271/117; 271/127; 271/190; 271/220; 271/222; 271/3.04; 271/136; 271/8.1; 271/4.01; 271/160; 399/210; 399/125; 399/367; 400/266.3; 400/624; 400/629; 400/642; 400/643; 400/645

(58) Field of Classification Search
None
See application file for complete search history.

(56) References Cited

U.S. PATENT DOCUMENTS

| | | | | |
|---|---|---|---|---|
| 5,152,622 A * | 10/1992 | Rasmussen et al. | .......... | 400/579 |
| 7,815,185 B2 * | 10/2010 | Claris et al. | .................. | 271/121 |
| 2009/0102117 A1 * | 4/2009 | Yu et al. | ........................ | 271/226 |
| 2010/0295234 A1 | 11/2010 | Liu | | |
| 2011/0236113 A1 * | 9/2011 | Ueyama et al. | ............... | 400/611 |
| 2013/0153370 A1 * | 6/2013 | Wang | ........................... | 198/780 |

FOREIGN PATENT DOCUMENTS

| | | |
|---|---|---|
| TW | 529863 | 4/2003 |
| TW | I228870 | 3/2005 |
| TW | I262166 | 9/2006 |
| TW | M320548 | 10/2007 |
| TW | M363391 | 8/2009 |

OTHER PUBLICATIONS

"Office Action of Taiwan Counterpart Application", issued on Feb. 22, 2013, p. 1-p. 7.

* cited by examiner

*Primary Examiner* — Miya J Cato

(74) *Attorney, Agent, or Firm* — Jianq Chyun IP Office

(57) ABSTRACT

A paper-feeding device and a multi-functional printer are provided. The paper-feeding device includes a base, a driving axle, a position-limiting element and a retaining element. The base has a first assembling portion. The driving axle, the position-limiting and the retaining elements are all in the base. The position-limiting element has a second assembling portion and two position-limiting portions on radial directions of the second assembling portion between the inserting portion and the body. The retaining element includes a swing frame, a paper-separating element and a spring. The body of the swing frame is located between the two position-limiting portions. The first and second pivoting portions coaxial and connect the body are pivoted respectively to the first and second assembling portions. The inserting portion of the paper-separating element is sheathed by the body and the separating element leans against the driving axle.

26 Claims, 12 Drawing Sheets

PAPER-FEEDING DEVICE AND MULTI-FUNCTIONAL PRINTERS HAVING A PAPER SEPARATING ELEMENT WITH PAPER INSERTING AND SEPARATING PORTIONS

CROSS-REFERENCE TO RELATED APPLICATION

This application claims the priority benefit of Taiwan application serial no. 99144525, filed on Dec. 17, 2010. The entirety of the above-mentioned patent application is hereby incorporated by reference herein and made a part of this specification.

BACKGROUND OF THE INVENTION

1. Field of the Invention

The invention generally relates to a paper-feeding device and a multi-functional printers, and more particularly, to a paper-feeding device insuring the paper to be fed in level and a multi-functional printers using the same.

2. Description of Related Art

Along with the advent of informational society, office automatic equipments such as scanner, photocopier, fax machine or printer would be disposed in an office, and users can conduct word processing work by means of the office automatic equipments. When the above-mentioned office automatic equipments are simultaneously disposed in an office, it will occupy a lot of spaces. Hence, a multi-function printers (MFP) integrating the functions of photocopying, printing, scanning and the like has been developed to solve the above-mentioned space problem.

Usually, a user places a pile of paper at the MFP to conduct photocopying, printing or scanning. In order to make the MFP working with one piece of paper at a time, usually the paper-feeding device employs a paper-separating part, wherein an often paper-separating way is to utilize the buckling of paper for taking the paper; for example, it makes paper buckling by means of a friction action provided by a friction plate or a saw-teeth shape structure. However, the said paper-separating way has a certain operation limitation; namely, the paper must occupy a specific angle range relatively to the paper-separating part so as to effectively separate paper. In other words, if it fails to organize the paper to occupy the above-mentioned specific angles relative to the paper-separating part prior to separating the paper, the chance of successively feeding paper one piece by one piece would be reduced.

SUMMARY OF THE INVENTION

Accordingly, the invention is directed to a paper-feeding device insuring the paper to be fed in level.

The invention provides a paper-feeding device suitable to feed paper, which includes a base, a driving axle, a position-limiting element and a retaining element. The base has a first assembling portion, and all of the driving axle, the position-limiting element and the retaining element are disposed in the base, wherein the position-limiting element and the retaining element are located above the driving axle, and the retaining element is located at a side of the position-limiting element. The position-limiting element has a second assembling portion, a first position-limiting portion and a second position-limiting portion, and the first position-limiting portion and the second position-limiting portion are located on radial directions having an included angle with each other of the second assembling portion. The retaining element includes a swing frame, a paper-separating element and a spring. The swing frame has a body, a first pivoting portion and a second pivoting portion, wherein the body is located between the first position-limiting portion and the second position-limiting portion of the position-limiting element, the first pivoting portion and the second pivoting portion are connected to the body from below, located at the opposite sides of the body and coaxial with each other. The first pivoting portion is pivoted to the first assembling portion and the second pivoting portion is pivoted to the second assembling portion. The paper-separating element has an inserting portion and a paper-separating portion, wherein the inserting portion is sheathed by and disposed at the body of the swing frame and the paper-separating portion leans against the driving axle. The spring is disposed between the inserting portion of the paper-separating element and the body of the swing frame.

In an embodiment of the present invention, the above-mentioned body has a datum plane and an accommodation space located under the datum plane, the driving axle is located in the accommodation space and the first assembling portion is protrudent out of the datum plane. The base further has a third assembling portion disposed on the datum plane, the third assembling portion has an assembling inclination surface having an included angle with the datum plane, the position-limiting element further has a fourth assembling portion connecting the second assembling portion, a normal direction of the fourth assembling portion is perpendicular to the normal direction of the second assembling portion and the fourth assembling portion is fixed at the assembling inclination surface. The paper-feeding device further includes a fastener going through the fourth assembling portion and locked in the third assembling portion.

In an embodiment of the present invention, both the first assembling portion and the second assembling portion respectively have an open hole or a pivot, and both the first pivoting portion and the second pivoting portion respectively and correspondingly have a pivot or an open hole.

In an embodiment of the present invention, the above-mentioned second assembling portion is in sector shape.

In an embodiment of the present invention, the above-mentioned driving axle includes a shaft rod and a paper-picking roller, wherein the shaft rod is sheathed by and disposed in the paper-picking roller and both ends of the shaft rod are disposed at and passing through the base.

In an embodiment of the present invention, the above-mentioned body of the swing frame has an accommodation recess and two guiding walls located at opposite sides of the accommodation recess, there are two position-limiting grooves at the two opposite sides of the inserting portion of the paper-separating element and the guiding walls are correspondingly located in the position-limiting grooves, and the inserting portion further has two position-limiting hooks disposed on the position-limiting grooves, and each of the position-limiting hook has a hooking portion correspondingly located in the accommodation recess and the positions of the hooking portions are limited by the guiding walls. The body of the swing frame further has a first shaft located in the accommodation space and the inserting portion further has a second shaft located between the position-limiting hooks, the first shaft and the second shaft are coaxial with each other and both ends of the spring sheathe the first shaft and the second shaft.

In an embodiment of the present invention, the above-mentioned paper-feeding device further includes a soft material pad disposed on a surface facing the driving axle of the paper-separating portion and contacting the driving axle.

In an embodiment of the present invention, the above-mentioned included angle between the first position-limiting portion and the second position-limiting portion ranges between 0° and 180°.

In an embodiment of the present invention, when the driving axle rotates along a first direction, the body of the swing frame takes the first pivoting portion and the second pivoting portion as the rotation shaft to rotate until the body leans against the first position-limiting portion so as to retain the paper from feeding; when the driving axle rotates along a second direction opposite to the first direction, the body of the swing frame takes the first pivoting portion and the second pivoting portion as the rotation shaft to rotate until the body leans against the second position-limiting portion so that the paper-separating element contacts the edge of the driving axle to make the paper fed in level.

The invention also provides a multi-functional printer, which includes a casing and an above-mentioned paper-feeding device. The casing has a rail and the paper-feeding device is installed in the casing and located at the inlet of the rail.

Based on the mentioned above, when the driving axle rotates in reverse, the paper-feeding device of the invention would drive the swing frame of the retaining element rotating around the rotation axis of the first pivoting portion and the second pivoting portion coaxial with each other so as to retain. When the driving axle rotates forward, the paper-feeding device would drive the retaining element rotating around the rotation axis of the first pivoting portion and the second pivoting portion so as to feed the paper and meanwhile the retaining element would keep applying an even force to make the paper fed in level.

In order to make the aforementioned and other features and advantages of the invention comprehensible, several exemplary embodiments accompanied with figures are described in detail below.

DESCRIPTION OF THE EMBODIMENTS

Figure 1:
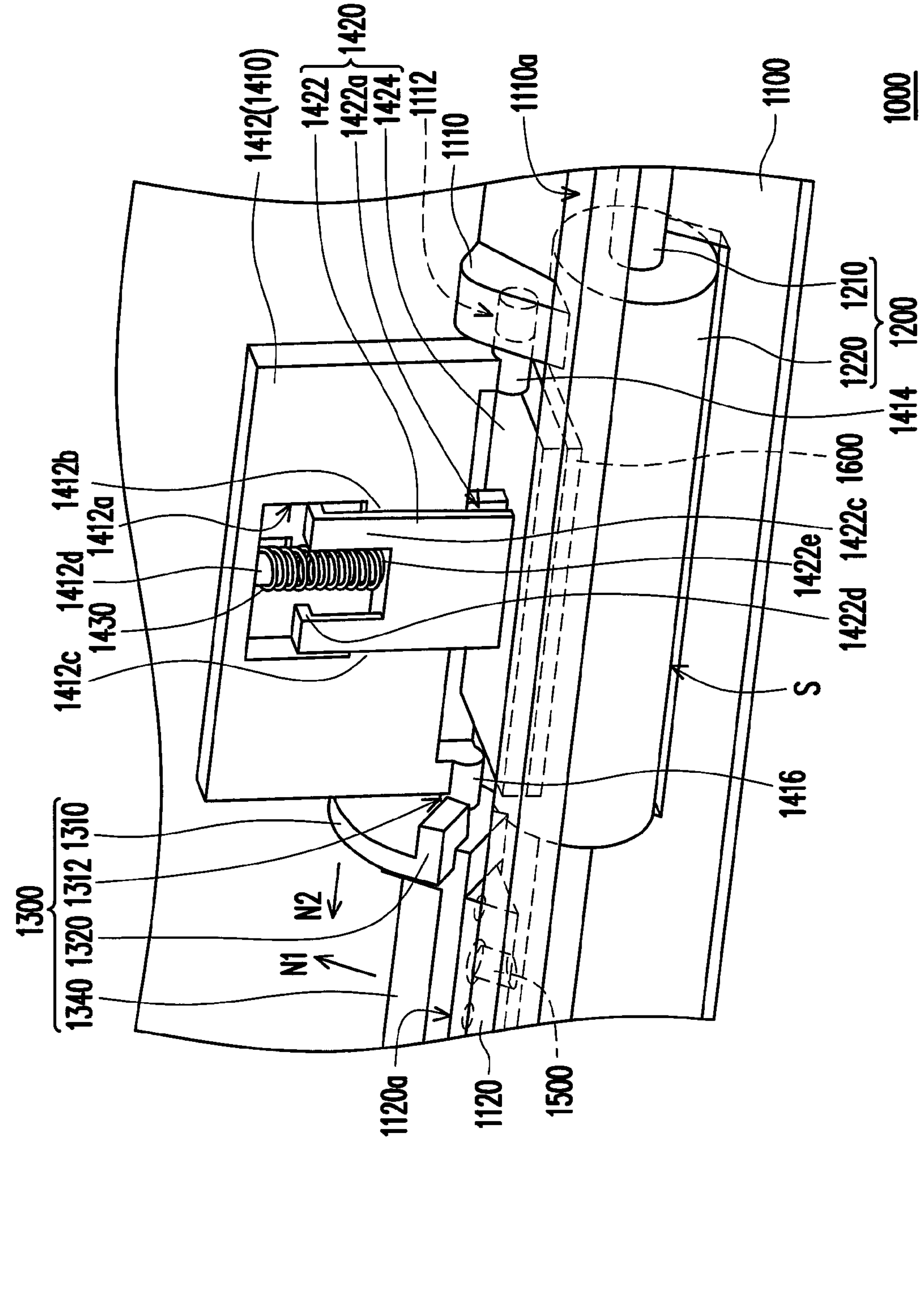
FIG. 1 is an assembling diagram of a paper-feeding device according to an embodiment of the invention.

Reference will now be made in detail to the preferred embodiments of the invention, examples of which are illustrated in the accompanying drawings. Wherever possible, the same reference numbers are used in the drawings and the description to refer to the same or like parts.

Figure 2:
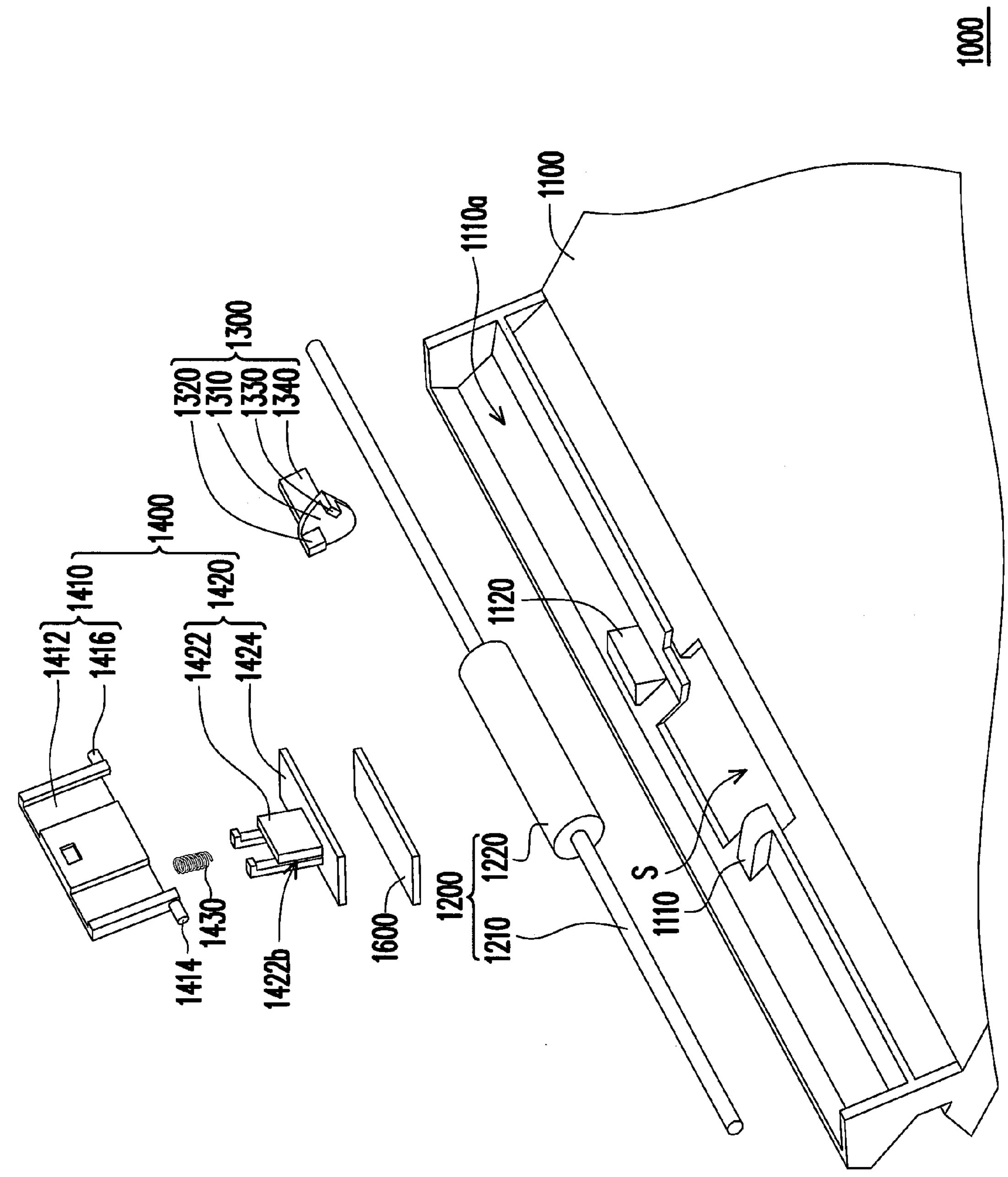
FIG. 2 is an exploded diagram of the paper-feeding device of FIG. 1.
Figure 3:
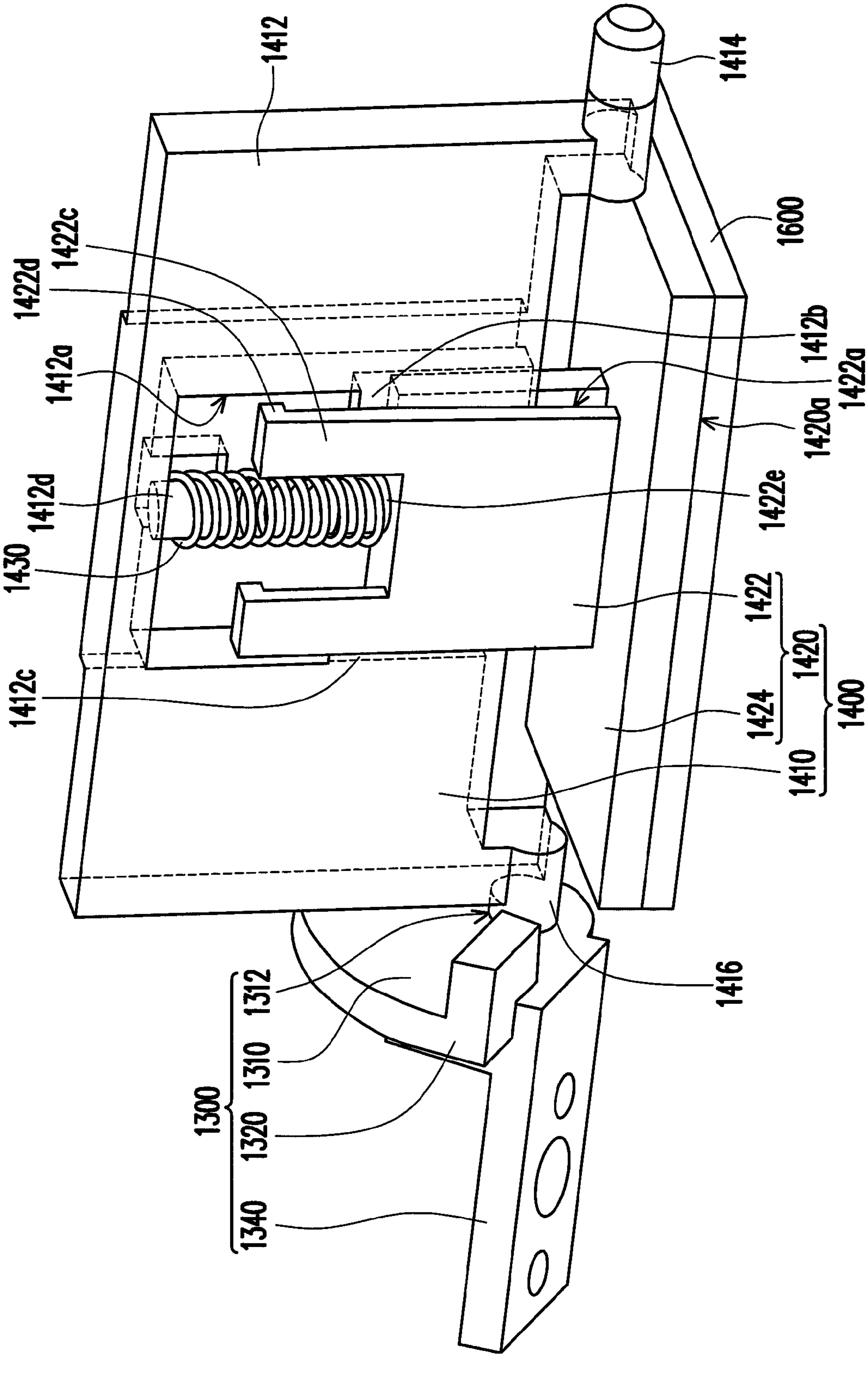
FIG. 3 is an assembling diagram of the retaining element and the position-limiting element of FIG. 2.

FIG. 1 is an assembling diagram of a paper-feeding device according to an embodiment of the invention. FIG. 2 is an exploded diagram of the paper-feeding device of FIG. 1. FIG. 3 is an assembling diagram of the retaining element and the position-limiting element of FIG. 2. Referring to FIGS. 1, 2 and 3, wherein FIG. 2 has an angle of view different from the angles of view of FIGS. 1 and 3, a paper-feeding device 1000 of the embodiment is installed in a casing 3100 (see FIG. 6A) of an MFA 3000 (see FIG. 6A) for feeding paper into the MFA 3000, transporting the paper at a rail 3200 of the casing 3100 of the MFA 3000 (see FIG. 6A) and printing. The paper-feeding device 1000 is installed at an inlet 3202 (see FIG. 6A) of the rail 3200 and includes a base 1100, a driving axle 1200, a position-limiting element 1300 and a retaining element 1400. The base 1100 has a first assembling portion 1110 and all the driving axle 1200, the position-limiting element 1300 and the retaining element 1400 are disposed in the base 1100, wherein both the position-limiting element 1300 and the retaining element 1400 are located above the driving axle 1200 and the retaining element 1400 is located at a side of the position-limiting element 1300. The position-limiting element 1300 has a second assembling portion 1310, a first position-limiting portion 1320 and a second position-limiting portion 1330, and the first position-limiting portion 1320 and the second position-limiting portion 1330 are located on two radial directions having an included angle with each other of the second assembling portion 1310, wherein the angle can be an acute angle or an obtuse angle and the angle ranges between 0° and 180°. The retaining element 1400 includes a swing frame 1410, a paper-separating element 1420 and a spring 1430. The swing frame 1410 has a body 1412, a first pivoting portion 1414 and a second pivoting portion 1416, wherein the body 1412 is located between the first position-limiting portion 1320 and the second position-limiting portion 1330 of the position-limiting element 1300. The first pivoting portion 1414 and the second pivoting portion 1416 are connected to the body 1412 from below and located at the two opposite sides of the body 1412 and are coaxial with each other. The first pivoting portion 1414 is pivoted to the first assembling portion 1110 and the second pivoting portion 1416 is pivoted to the second assembling portion 1310. The paper-separating element 1420 has an inserting portion 1422 and a paper-separating portion 1424, wherein the inserting portion 1422 is sheathed by and disposed at the body 1412 of the swing frame 1410, and the paper-separating portion 1424 leans against the driving axle 1200. The spring 1430 is disposed between the inserting portion 1422 of the paper-separating element 1420 and the body 1412 of the swing frame 1410.

The base 1100 has a datum plane 1110_a_ and an accommodation space S located under the datum plane 1110_a_, and the driving axle 1200 is located in the accommodation space S. The driving axle 1200 includes a shaft rod 1210 and a paper-picking roller 1220, wherein the shaft rod 1210 is sheathed by and disposed in the paper-picking roller 1220. Both ends of the shaft rod 1210 are disposed at and passing through the base 1100, wherein one end is further connected to a motor (not shown) so that the rotating motor would bring the shaft rod 1210 for rotation.

Figure 4:
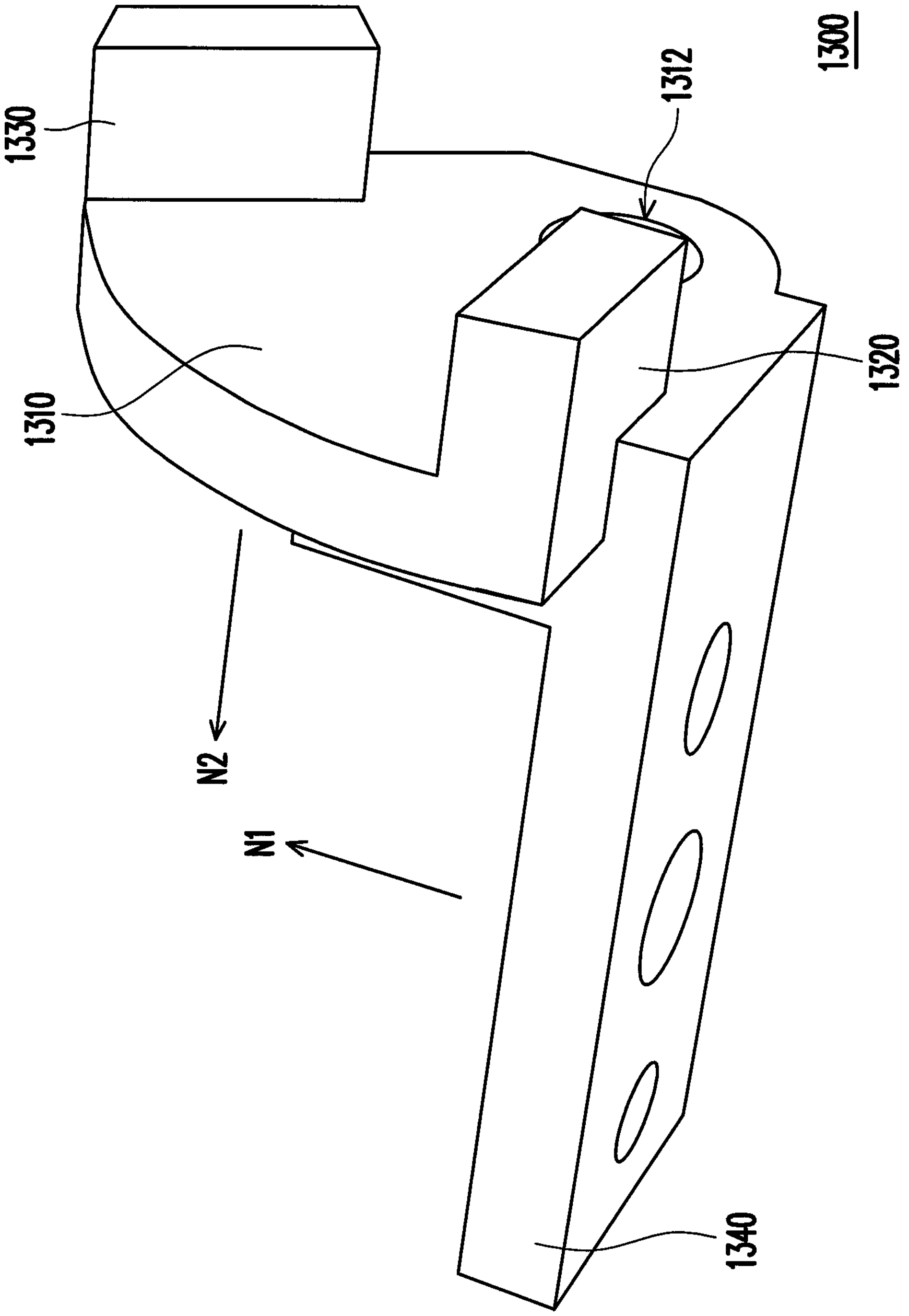
FIG. 4 is a diagram of a position-limiting element.

FIG. 4 is a diagram of a position-limiting element. Referring to FIGS. 1, 3 and 4, the first assembling portion 1110 of the base 1100 is protrudent out of the datum plane 1110_a_ and the first assembling portion 1110 has an open hole 1112. The second assembling portion 1310 of the position-limiting element 1300 in the embodiment is in sector shape and has an open hole 1312, and the open hole 1112 of the first assembling portion 1110 and the open hole 1312 of the second assembling portion 1310 are disposed correspondingly to each other. Accordingly, the first pivoting portion 1414 pivoted to the first assembling portion 1110 and the second pivoting portion 1416 pivoted to the second assembling portion 1310 are respectively a pivot and the two pivots are correspondingly inserted into the open hole 1112 and the open hole 1312, so that the retaining element 1400 can take the first pivoting portion 1414 and the second pivoting portion 1416 coaxial with each other as the rotation shaft to rotate relatively to the position-limiting element 1300. Certainly, the first assembling portion 1110 and the second assembling portion 1310 can respectively have a pivot and both the first pivoting portion 1414 and the second pivoting portion 1416 are open holes, so that the retaining element 1400 can take the first pivoting portion 1414 and the second pivoting portion 1416 coaxial with each other as the rotation shaft to rotate relatively to the position-limiting element 1300.

In addition, the base 1100 further has a third assembling portion 1110 in triangle pillar shape. The third assembling portion 1110 is disposed on the datum plane 1110*a* and has an assembling inclination surface 1120*a* with an acute included angle towards the datum plane 1110*a*. The position-limiting element 1300 further has a fourth assembling portion 1340 connected to the second assembling portion 1310, wherein the normal direction N1 of the fourth assembling portion 1340 is perpendicular to the normal direction N2 of the second assembling portion 1310, and the fourth assembling portion 1340 is fixed at the assembling inclination surface 1120*a*. In the embodiment, the paper-feeding device 1000 further includes a fastener 1500 going through the fourth assembling portion 1340 and locked in the third assembling portion 1110.

Figure 5A:
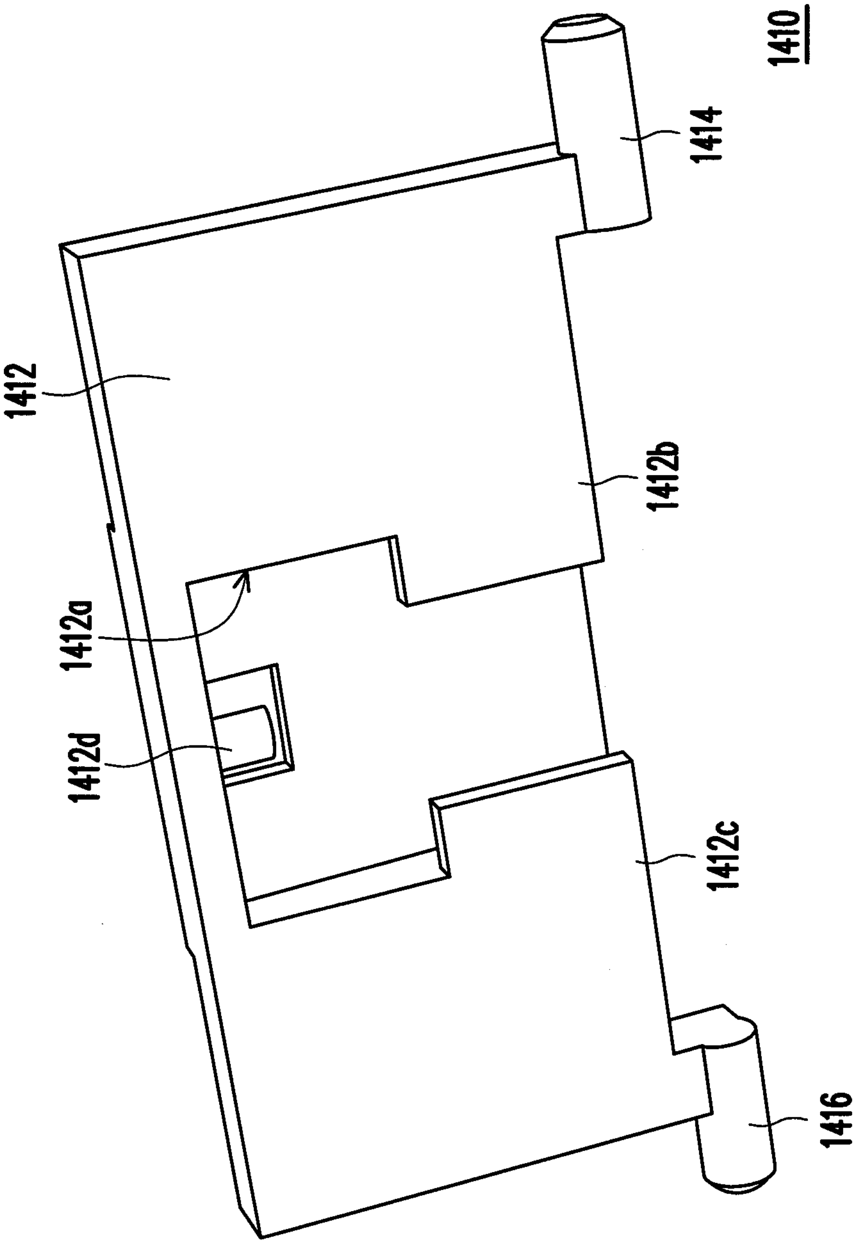
FIGS. 5A and 5B are two diagrams of the swing frame of FIG. 3 from different angles of view.
Figure 5B:
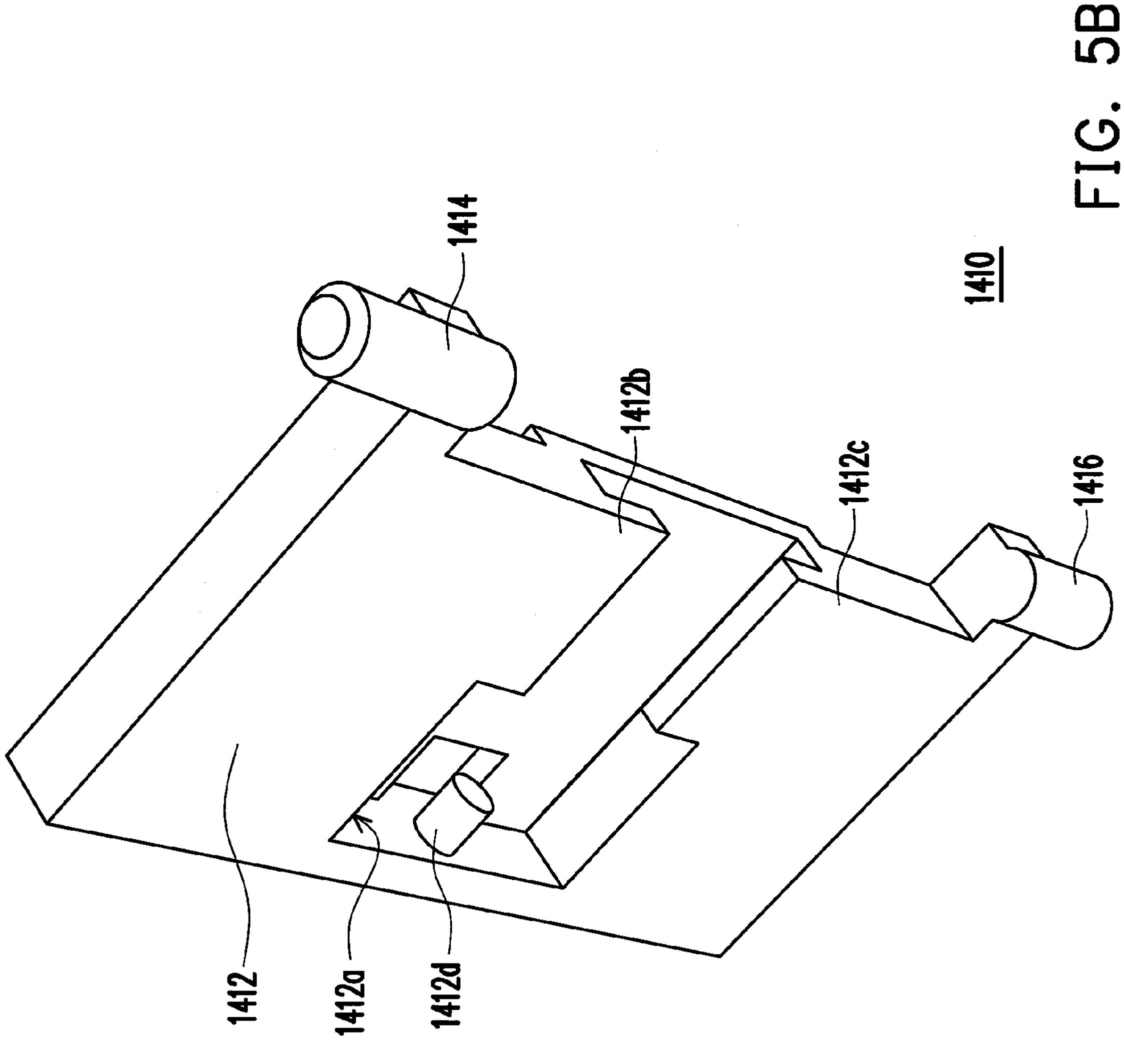
Figure 5C:
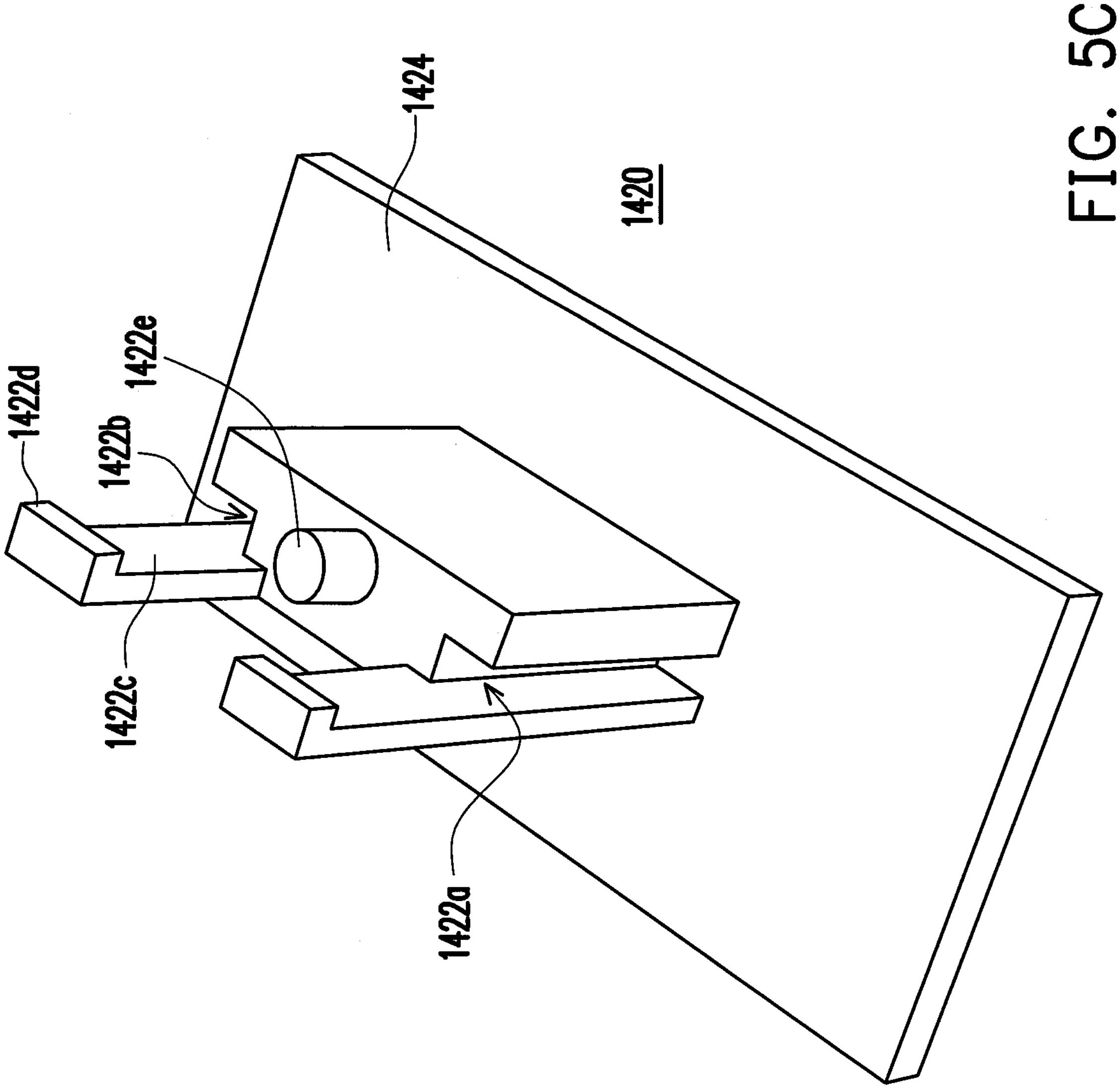
FIG. 5C is a diagram of the paper-separating element of FIG. 3.

FIGS. 5A and 5B are two diagrams of the swing frame of FIG. 3 from different angles of view, and FIG. 5C is a diagram of the paper-separating element of FIG. 3. Referring to FIGS. 3 and 5A-5C, the body 1412 of the above-mentioned swing frame 1410 has an accommodation recess 1412*a* and two guiding walls 1412*b* and 1412*c* located at the two opposite sides of the accommodation recess 1412*a*. Two position-limiting grooves 1422*a* and 1422*b* are disposed at the two opposite sides of the inserting portion 1422 of the paper-separating element 1420, and the two guiding walls 1412*b* and 1412*c* are located correspondingly to the two position-limiting grooves 1422*a* and 1422*b*. The inserting portion 1422 further has two position-limiting hooks 1422*c* disposed respectively on the position-limiting grooves 1422*a* and 1422*b*, wherein each of the position-limiting hooks 1422*c* has a hooking portion 1422*d* correspondingly located in the accommodation recess 1412*a* and the positions of the two hooking portions 1422*d* are limited by the two guiding walls 1412*b* and 1412*c*. It should be noted that the length of the hooking portion 1422*d* of the position-limiting hook 1422*c* can be slightly greater than the depth of the accommodation recess 1412*a* so that the hooking portions 1422*d* can touch the bottom of the accommodation recess 1412*a* to increase the stability of the paper-separating element 1420 assembled at the swing frame 1410.

In addition, the body 1412 of the swing frame 1410 further has a first shaft 1412*d* located in the accommodation recess 1412*a*, the inserting portion 1422 further has a second shaft 1422*e* located between the two position-limiting hooks 1422*c*, the first shaft 1412*d* and the second shaft 1422*e* are coaxial with each other, and both ends of the spring 1430 sheathe the first shaft 1412*d* and the second shaft 1422*e*.

The paper-feeding device 1000 further includes a soft material pad 1600 disposed on a surface 1420*a* facing the driving axle 1200 of the paper-separating portion 1424. The soft material pad 1600 contacts the driving axle 1200.

Figure 6A:
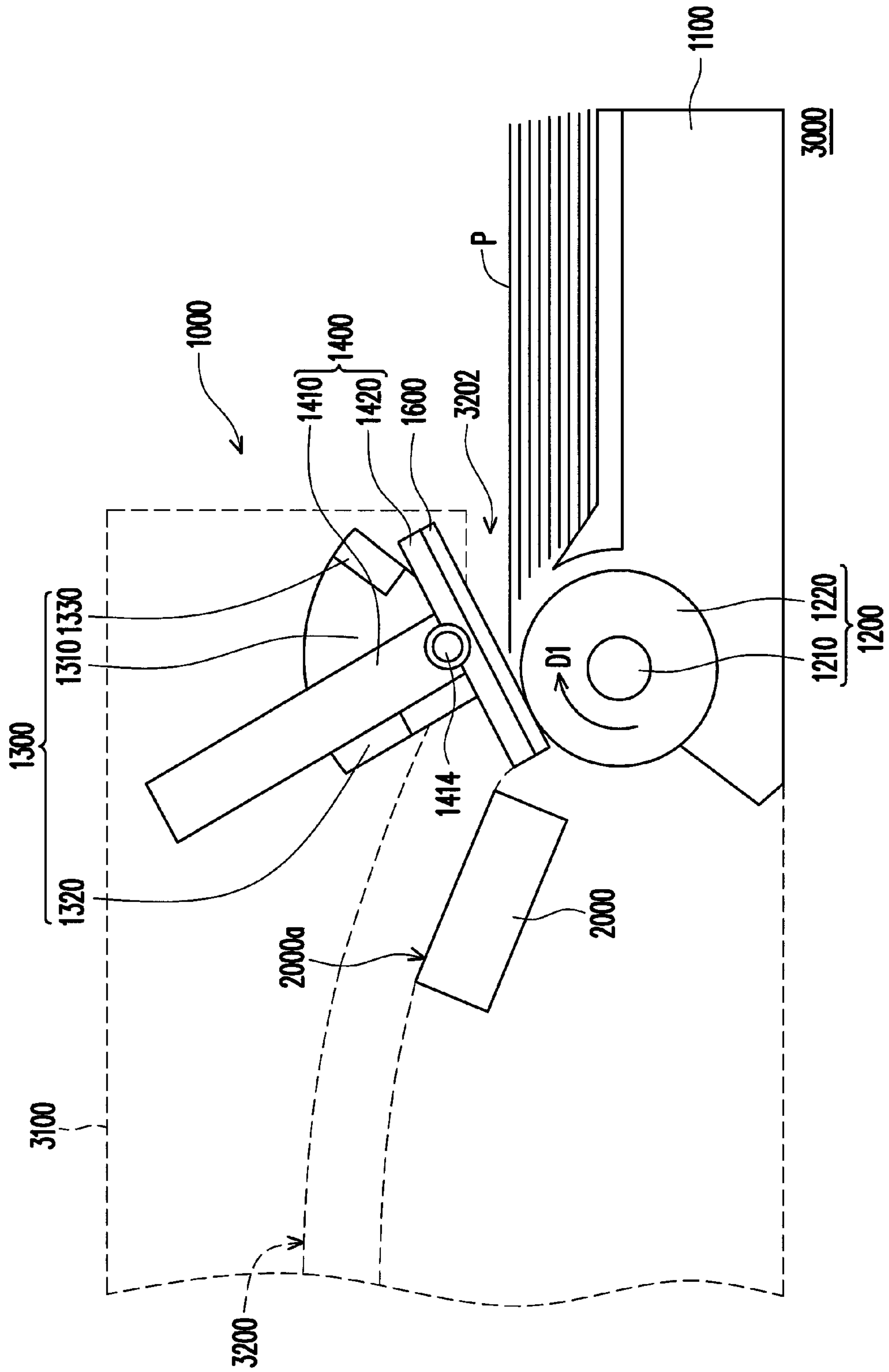
FIGS. 6A and 6B are two diagrams showing the paper-feeding device retains paper to prevent the paper from feeding from different angles of view.
Figure 6B:
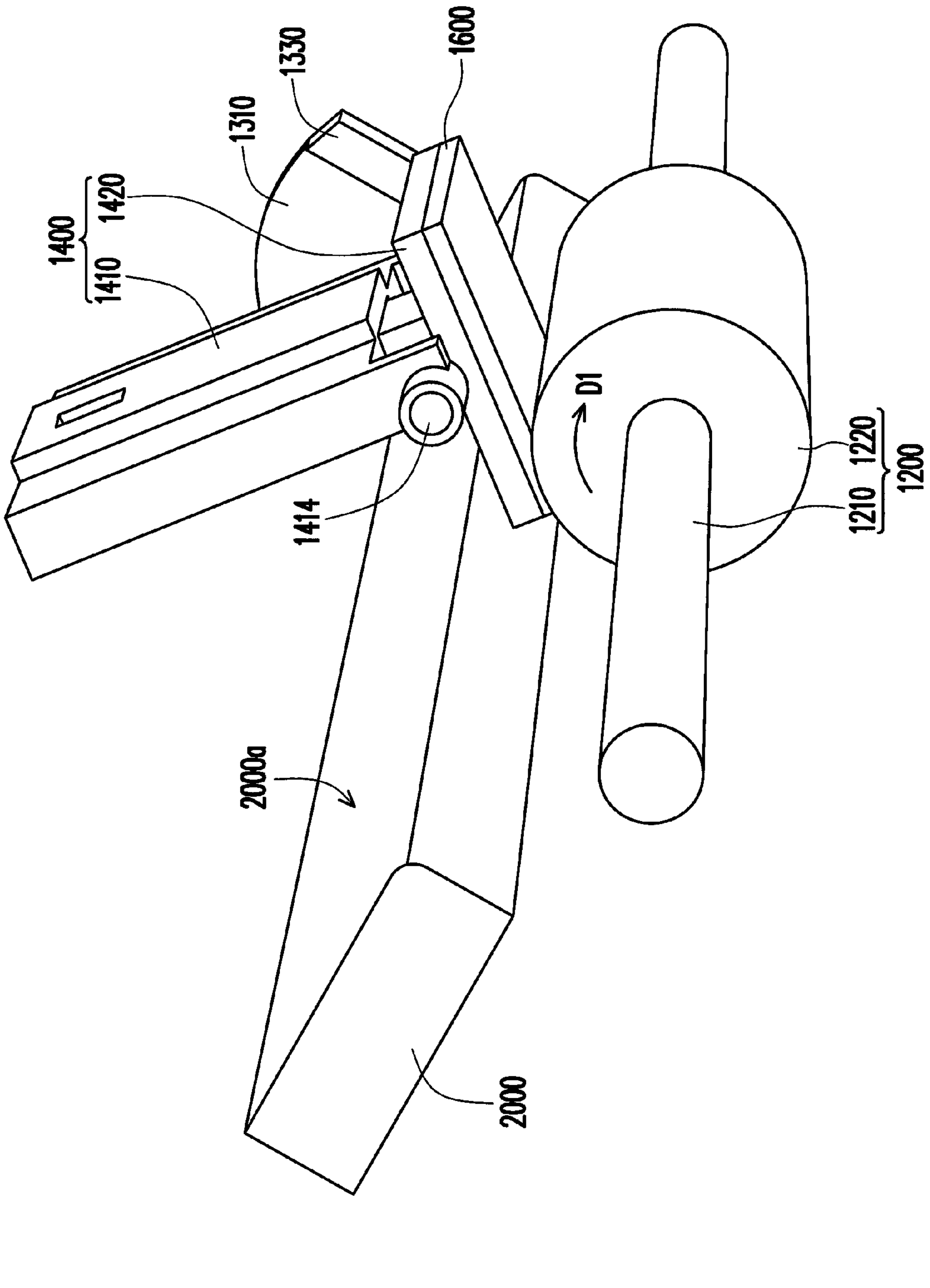

FIGS. 6A and 6B are two diagrams showing the paper-feeding device retains paper to prevent the paper from feeding from different angles of view. Referring to FIGS. 6A and 6B, when the driving axle 1200 rotates along a first direction D1, since the soft material pad 1600 disposed on the surface 1420*a* facing the driving axle 1200 of the paper-separating portion 1424 and contacting the driving axle 1200 is acted by the rotation of the driving axle 1200 so as to bring the body 1412 of the swing frame 1410 of the retaining element 1400, taking the first pivoting portion 1414 and the second pivoting portion 1416 as the rotation shaft, to rotate until the body 1412 leans against the first position-limiting portion 1320. At the time, the spring 1430 applies a force to the paper-separating element 1420, and the force has a vertical component of the force in the vertical direction to keep the paper-separating element 1420 steadily contacting the paper-picking roller 1220 of the driving axle 1200, which retains the paper P from being fed.

In addition, the shaft rod 1210 makes the paper-picking roller 1220 keep rotating along the first direction D1 so as to reach the object of organizing the paper P and avoiding the paper P from skew.

Figure 7A:
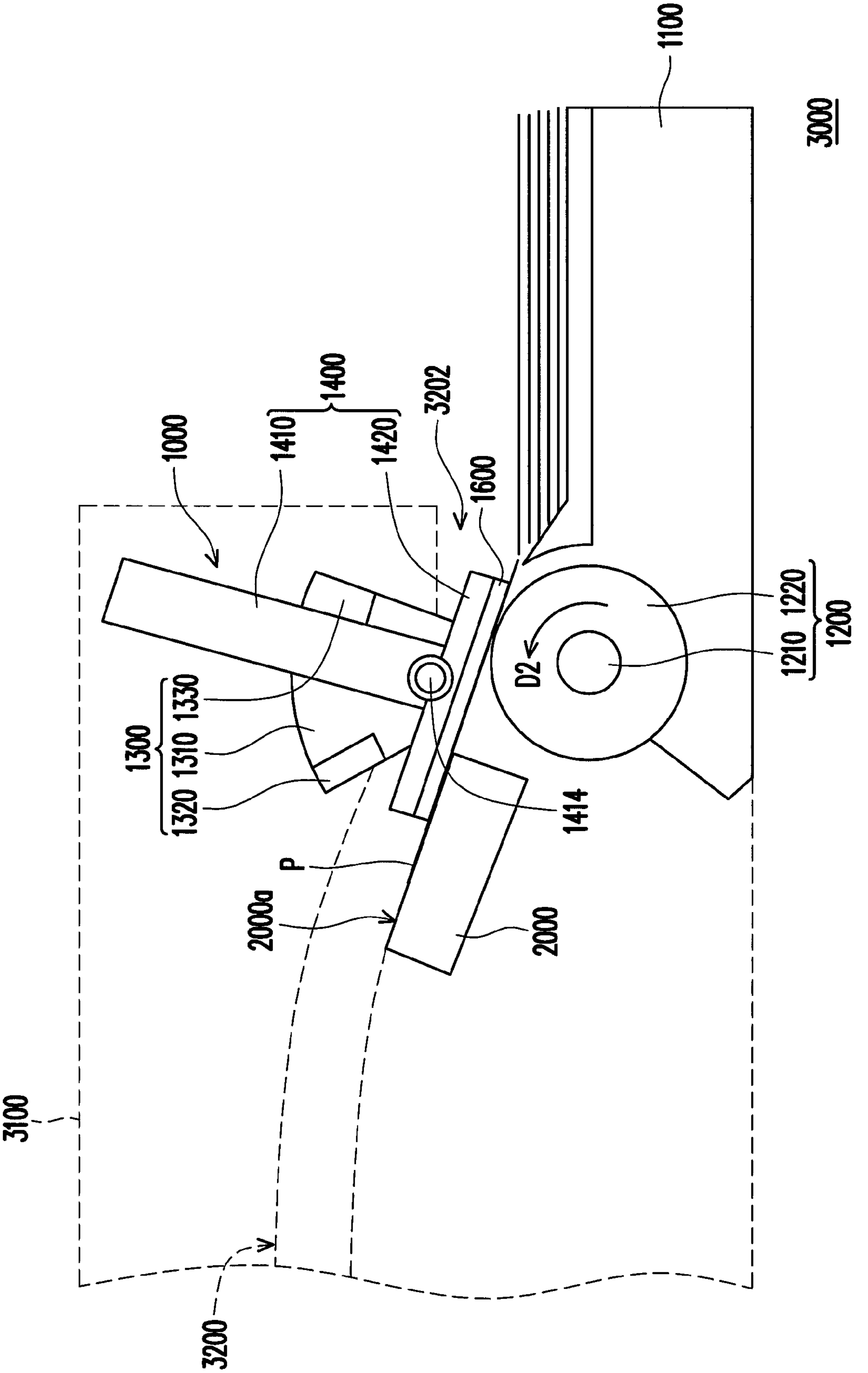
FIGS. 7A and 7B are two diagrams showing the paper-feeding device makes paper feeding from different angles of view.
Figure 7B:
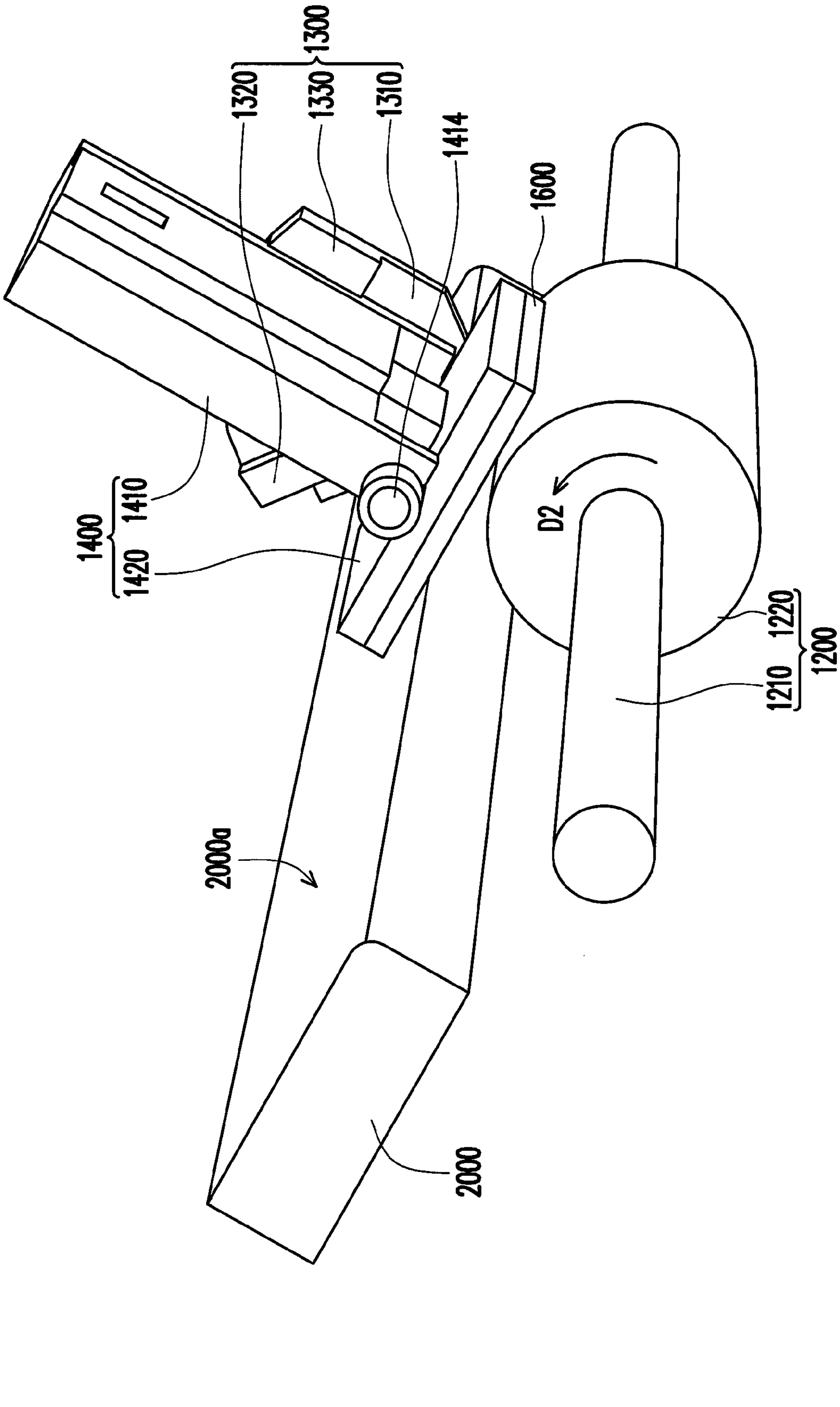
Figure 8:
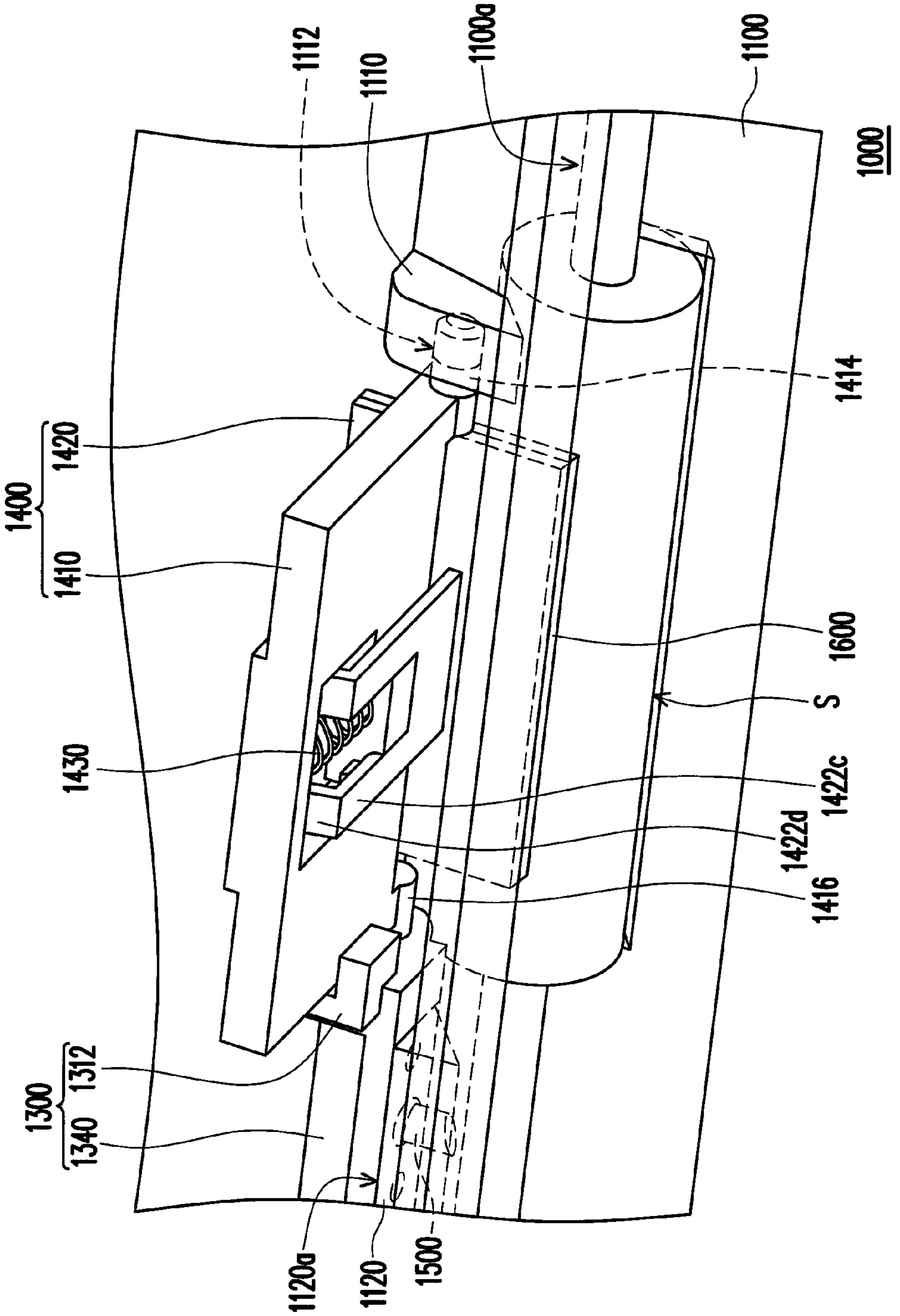
FIG. 8 is a three-dimensional diagram of an MFA during feeding paper.

FIGS. 7A and 7B are two diagrams showing the paper-feeding device makes paper feeding from different angles of view and FIG. 8 is a three-dimensional diagram of an MFA during feeding paper. Referring to FIGS. 7A, 7B and 8, when the driving axle 1200 rotates along a second direction D2 opposite to the first direction D1, the body 1412 of the swing frame 1410, taking the first pivoting portion 1414 and the second pivoting portion 1416 as the rotation shaft, rotates until the body 1412 leans against the second position-limiting portion 1330. At the time, the paper P is acted by the rotating paper-picking roller 1220 and thereby forward enters between the paper-picking roller 1220 and the retaining element 1400 and the paper P is fed. In particular, since the soft material pad 1600 is disposed on the surface 1420*a* facing the paper-picking roller 1220 of the paper-separating element 1420, the soft material pad 1600, in association with the spring 1430 which steadily applies a component of force to the inserting portion 1422 of the paper-separating element 1420, contacts the driving axle 1200 at the front edge of the paper-separating element 1420 so that the paper P can be fed in level. It should be noted that, during feeding the paper P, the surface 1420*a* of the paper-separating element 1420 is parallel to the surface 200*a* of a device 2000 (for example, a ink-jetting device) disposed on the paper-feeding path and located after the paper-feeding device 1000, so that the paper P can enter the device 2000 in level.

When the retaining element 1400 is acted by the rotating driving axle 1200 in a rotation direction to rotate relatively to the position-limiting element 1300 and during the paper P is entering between the paper-picking roller 1220 and the retaining element 1400, due to the rolling action of the paper-picking roller 1220 or the effect of the thickness of the paper P, the paper-separating element 1420 would move up and down relatively to the swing frame 1410 along an axis formed by the first shaft 1412*d* of the body 1412 and the second shaft 1422*e* of the inserting portion 1422 wherein the first shaft 1412*d* and the second shaft 1422*e* are coaxial with each other. At the time, the guiding walls 1412*b* and 1412*c* of the body 1412 of the swing frame 1410 and the position-limiting grooves 1422*a* and 1422*b* of the inserting portion 1422 of the paper-separating element 1420 function to ensure the paper-separating element 1420 only moving up and down relatively to the swing frame 1410 without left and right deflections. On the other hand, limited by the profile of the accommodation recess 1412*a* and the disposition of the guiding walls 1412*b* and 1412*c*, the up and down moving distance of the paper-separating element 1420 relatively to the swing frame 1410 can be limited, while the elastic resuming force provided by the spring 1430 is steadily applied to the body 1412 of the swing frame 1410 and the inserting portion 1422 of the paper-separating element 1420, which makes the paper-separating portion 1424 steadily contacting the paper-picking roller 1220.

In summary, the retaining element of the paper-feeding device in the invention is able to change the position thereof relative to the driving axle by means of the rotation direction of the driving axle so as to decide whether the paper is retained or fed. In addition, by disposing the spring of the retaining element, the spring can steadily apply a force to the paper-separating element of the retaining element, which makes the paper-separating element steadily with an even force contact the paper-picking roller of the driving axle and makes the paper-separating element with an even force contact the paper-picking roller of the driving axle. During retaining paper, the paper-feeding device of the invention can get a good retaining effect and make the paper-picking roller organize the paper to avoid the paper from skew; during feeding paper, the paper-feeding device can achieve the object of feeding the paper smoothly.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. A paper-feeding device suitable to feed paper, comprising:

a base, having a first assembling portion;

a driving axle, disposed in the base;

a position-limiting element, installed in the base and located above the driving axle, wherein the position-limiting element has a second assembling portion, a first position-limiting portion and a second position-limiting portion, and the first position-limiting portion and the second position-limiting portion are located on two radial directions having an included angle with each other of the second assembling portion;

a retaining element, disposed in the base, located above the driving axle and at a side of the position-limiting element and comprising:

a swing frame, having a body, a first pivoting portion and a second pivoting portion, wherein the body is located between the first position-limiting portion and the second position-limiting portion of the position-limiting element, the first pivoting portion and the second pivoting portion are coaxial with each other, connected to the body from below and located at the two opposite sides of the body, and the first pivoting portion is pivoted to the first assembling portion and the second pivoting portion is pivoted to the second assembling portion;

a paper-separating element, having an inserting portion and a paper-separating portion, wherein the inserting portion is sheathed by and disposed in the body of the swing frame and the paper-separating portion leans against the driving axle; and a spring, disposed between the inserting portion of the paper-separating element and the body of the swing frame.

2. The paper-feeding device as claimed in claim 1, wherein the base has a datum plane and an accommodation space located under the datum plane, the driving axle is located in the accommodation space and the first assembling portion is protrudent out of the datum plane.

3. The paper-feeding device as claimed in claim 2, wherein the base further has a third assembling portion disposed on the datum plane, the third assembling portion has an assembling inclination surface, the assembling inclination surface has an included angle with the datum plane, the position-limiting element further has a fourth assembling portion connecting the second assembling portion, the normal direction of the fourth assembling portion is perpendicular to the normal direction of the second assembling portion and the fourth assembling portion is fixed at the assembling inclination surface.

4. The paper-feeding device as claimed in claim 3, further comprising a fastener going through the fourth assembling portion into the third assembling portion.

5. The paper-feeding device as claimed in claim 1, wherein both the first assembling portion and the second assembling portion respectively have an open hole or a pivot, and both the first pivoting portion and the second pivoting portion respectively and correspondingly have a pivot or an open hole.

6. The paper-feeding device as claimed in claim 1, wherein the second assembling portion is in sector shape.

7. The paper-feeding device as claimed in claim 1, wherein the driving axle comprises a shaft rod and a paper-picking roller, wherein the shaft rod is sheathed by and disposed in the paper-picking roller and both ends of the shaft rod are disposed at and passing through the base.

8. The paper-feeding device as claimed in claim 1, wherein the body of the swing frame has an accommodation recess and two guiding walls located at the two opposite sides of the accommodation recess, there are two position-limiting grooves at the two opposite sides of the inserting portion of the paper-separating element and the guiding walls are correspondingly located in the position-limiting grooves.

9. The paper-feeding device as claimed in claim 8, wherein the inserting portion further has two position-limiting hooks disposed on the position-limiting grooves, and each of the position-limiting hook has a hooking portion correspondingly located in the accommodation recess and the positions of the hooking portions are limited by the guiding walls.

10. The paper-feeding device as claimed in claim 9, wherein the body of the swing frame further has a first shaft located in the accommodation space and the inserting portion further has a second shaft located between the position-limiting hooks, the first shaft and the second shaft are coaxial with each other and both ends of the spring sheathe the first shaft and the second shaft.

11. The paper-feeding device as claimed in claim 1, further comprising a soft material pad disposed on a surface of the paper-separating portion facing the driving axle and contacting the driving axle.

12. The paper-feeding device as claimed in claim 1, wherein when the driving axle rotates along a first direction, the body of the swing frame takes the first pivoting portion and the second pivoting portion as the rotation shaft to rotate until the body leans against the first position-limiting portion so as to retain the paper from feeding; and when the driving axle rotates along a second direction opposite to the first direction, the body of the swing frame takes the first pivoting portion and the second pivoting portion as the rotation shaft to rotate until the body leans against the second position-limiting portion so that the paper-separating element contacts the edge of the driving axle to make the paper fed in level.

13. The paper-feeding device as claimed in claim 1, wherein the included angle between the first position-limiting portion and the second position-limiting portion ranges between 0° and 180°.

14. A multi-functional printer, comprising:
a casing, having a rail;
a paper-feeding device, installed in the casing and located at an inlet of the rail and comprising:
a base, having a first assembling portion;
a driving axle, disposed in the base;
a position-limiting element, installed in the base and located above the driving axle, wherein the position-limiting element has a second assembling portion, a first position-limiting portion and a second position-limiting portion, and the first position-limiting portion and the second position-limiting portion are located on two radial directions having an included angle with each other of the second assembling portion;
a retaining element, disposed in the base, located above the driving axle and at a side of the position-limiting element and comprising:
a swing frame, having a body, a first pivoting portion and a second pivoting portion, wherein the body is located between the first position-limiting portion and the second position-limiting portion of the position-limiting element, the first pivoting portion and the second pivoting portion are coaxial with each other, connected to the body from below and located at the two opposite sides of the body, and the first pivoting portion is pivoted to the first assembling portion and the second pivoting portion is pivoted to the second assembling portion;
a paper-separating element, having an inserting portion and a paper-separating portion, wherein the inserting portion is sheathed by and disposed at the body of the swing frame and the paper-separating portion leans against the driving axle; and
a spring, disposed between the inserting portion of the paper-separating element and the body of the swing frame.

15. The multi-functional printer as claimed in claim 14, wherein the base has a datum plane and an accommodation space located under the datum plane, the driving axle is located in the accommodation space and the first assembling portion is protrudent out of the datum plane.

16. The multi-functional printer as claimed in claim 15, wherein the base further has a third assembling portion disposed on the datum plane, the third assembling portion has an assembling inclination surface, the assembling inclination surface has an included angle with the datum plane, the position-limiting element further has a fourth assembling portion connecting the second assembling portion, the normal direction of the fourth assembling portion is perpendicular to the normal direction of the second assembling portion and the fourth assembling portion is fixed at the assembling inclination surface.

17. The multi-functional printer as claimed in claim 16, further comprising a fastener going through the fourth assembling portion into the third assembling portion.

18. The multi-functional printer as claimed in claim 14, wherein both the first assembling portion and the second assembling portion respectively have an open hole or a pivot, and both the first pivoting portion and the second pivoting portion respectively and correspondingly have a pivot or an open hole.

19. The multi-functional printer as claimed in claim 14, wherein the second assembling portion is in sector shape.

20. The multi-functional printer as claimed in claim 14, wherein the driving axle comprises a shaft rod and a paper-picking roller, wherein the shaft rod is sheathed by and disposed in the paper-picking roller and both ends of the shaft rod are disposed at and passing through the base.

21. The multi-functional printer as claimed in claim 14, wherein the body of the swing frame has an accommodation recess and two guiding walls located at the two opposite sides of the accommodation recess, there are two position-limiting grooves at the two opposite sides of the inserting portion of the paper-separating element and the guiding walls are correspondingly located in the position-limiting grooves.

22. The multi-functional printer as claimed in claim 21, wherein the inserting portion further has two position-limiting hooks disposed on the position-limiting grooves, and each of the position-limiting hook has a hooking portion correspondingly located in the accommodation recess and the positions of the hooking portions are limited by the guiding walls.

23. The multi-functional printer as claimed in claim 22, wherein the body of the swing frame further has a first shaft located in the accommodation space and the inserting portion further has a second shaft located between the position-limiting hooks, the first shaft and the second shaft are coaxial with each other and both ends of the spring sheathe the first shaft and the second shaft.

24. The multi-functional printer as claimed in claim 14, further comprising a soft material pad disposed on a surface of the paper-separating portion facing the driving axle and contacting the driving axle.

25. The multi-functional printer as claimed in claim 14, wherein when the driving axle rotates along a first direction, the body of the swing frame takes the first pivoting portion and the second pivoting portion as the rotation shaft to rotate until the body leans against the first position-limiting portion so as to retain the paper from feeding; and
when the driving axle rotates along a second direction opposite to the first direction, the body of the swing frame takes the first pivoting portion and the second pivoting portion as the rotation shaft to rotate until the body leans against the second position-limiting portion so that the paper-separating element contacts the edge of the driving axle to make the paper fed in level.

26. The multi-functional printer as claimed in claim 14, wherein the included angle between the first position-limiting portion and the second position-limiting portion ranges between 0° and 180°.

* * * * *